(12) United States Patent
Chapman

(10) Patent No.: US 8,475,060 B2
(45) Date of Patent: Jul. 2, 2013

(54) QUICK REPOSITIONER FOR A CAMERA HEAD

(75) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/450,224

(22) Filed: Apr. 18, 2012

(65) Prior Publication Data

US 2012/0269504 A1 Oct. 25, 2012

Related U.S. Application Data

(60) Provisional application No. 61/477,117, filed on Apr. 19, 2011.

(51) Int. Cl.
*G03B 17/00* (2006.01)
(52) U.S. Cl.
USPC ........ 396/428; 396/425; 348/722; 248/178.1; 248/185.1; 248/187.1
(58) Field of Classification Search
USPC ........ 396/419, 425, 428; 348/722; 248/178.1, 248/185.1, 187.1
See application file for complete search history.

(56) References Cited

U.S. PATENT DOCUMENTS

| | | | | | |
|---|---|---|---|---|---|
| 2,618,209 | A | * | 11/1952 | Silent | 396/93 |
| 4,943,019 | A | * | 7/1990 | Mester | 248/123.11 |
| 5,197,700 | A | * | 3/1993 | Chapman | 248/125.1 |
| 7,137,747 | B2 | * | 11/2006 | Chapman | 396/428 |
| 7,209,176 | B2 | * | 4/2007 | Chapman | 348/373 |
| 7,252,441 | B2 | * | 8/2007 | Chapman | 396/428 |
| 7,311,452 | B2 | * | 12/2007 | Chapman | 396/428 |
| 7,522,213 | B2 | * | 4/2009 | Chapman | 348/373 |
| 2003/0096587 | A1 | * | 5/2003 | Wildhagen | 455/234.2 |
| 2005/0052531 | A1 | * | 3/2005 | Kozlov et al. | 348/143 |
| 2005/0231634 | A1 | * | 10/2005 | Chapman | 348/373 |
| 2005/0232625 | A1 | * | 10/2005 | Chapman | 396/428 |
| 2007/0050139 | A1 | * | 3/2007 | Sidman | 701/220 |
| 2007/0182813 | A1 | * | 8/2007 | Kozlov et al. | 348/61 |
| 2008/0002967 | A1 | * | 1/2008 | Chapman | 396/428 |
| 2009/0231451 | A1 | * | 9/2009 | Chapman | 348/208.7 |

* cited by examiner

*Primary Examiner* — Clayton E LaBalle
*Assistant Examiner* — Warren K Fenwick
(74) *Attorney, Agent, or Firm* — Kenneth H. Ohriner; Perkins Coie LLP

(57) ABSTRACT

An accessory for use on a camera crane has a first plate attachable to an end of the camera crane arm. A second plate is pivotally attached to the first plate and moveable into a first position and into a second position perpendicular to the first position. First and second latches secure the second plate into the first and second positions, respectively. The accessory allows a camera head on a camera crane arm to be quickly and easily reoriented.

8 Claims, 6 Drawing Sheets

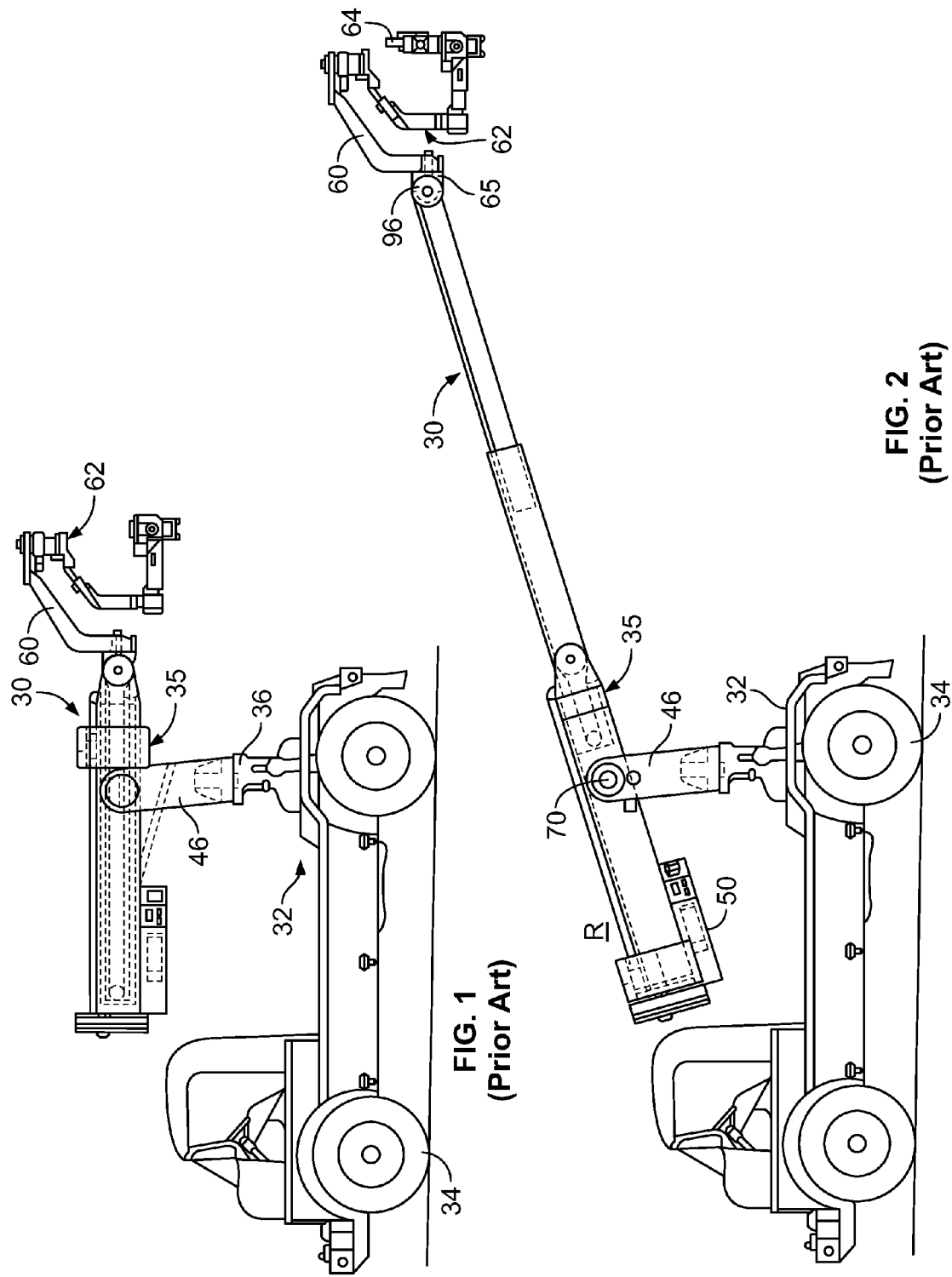

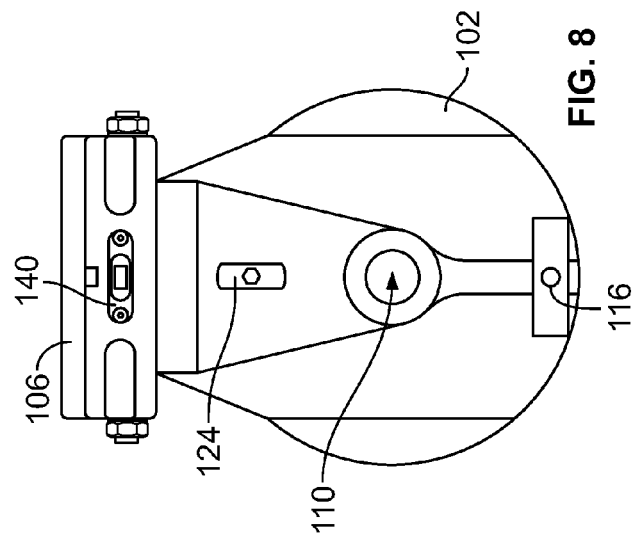
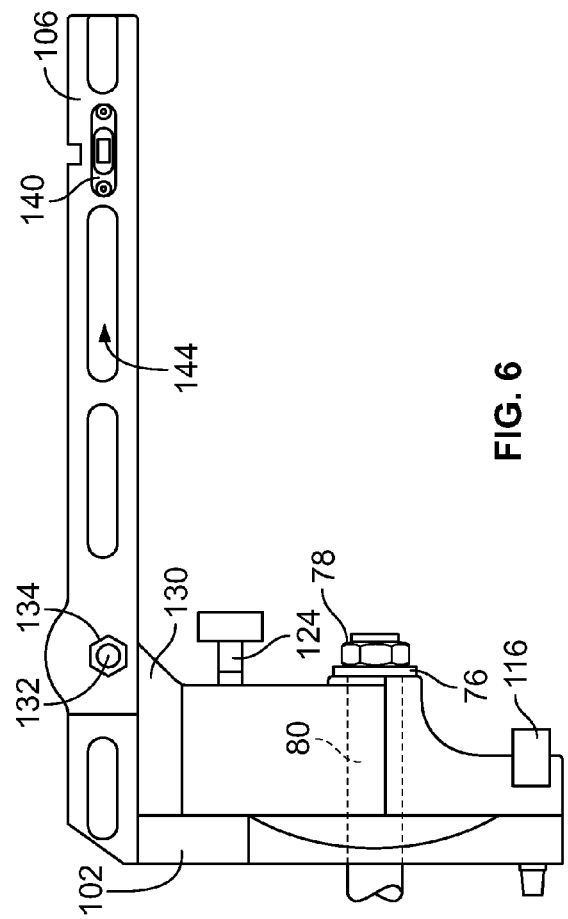
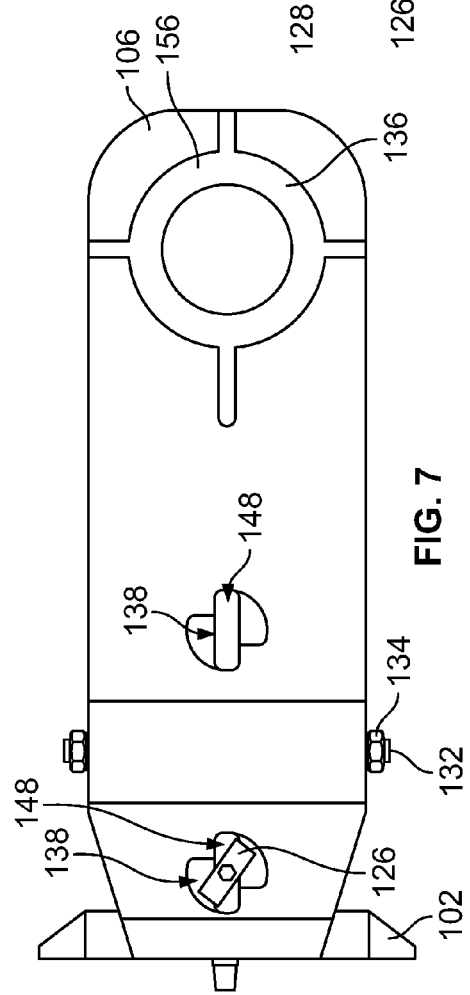
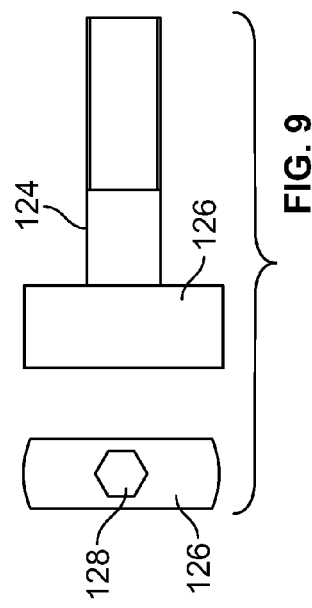

QUICK REPOSITIONER FOR A CAMERA HEAD

CROSS REFERENCE TO RELATED APPLICATIONS

This application claims the benefit of U.S. Provisional Patent Application No. 61/477,117, filed Apr. 19, 2012, which is incorporated herein by reference.

BACKGROUND OF THE INVENTION

Camera cranes are often used in motion picture and television production. The motion picture or television camera is typically mounted on a camera head on a telescoping crane arm supported on a mobile base, dolly, or truck. The camera head may be remotely controlled to aim the camera lens at the desired subject. The camera head typically is "under slung" with the top end of the head attached to the outer end of the crane arm. A pivoting attachment may be used, to allow the camera head to self-align via gravity with a pendulum-like movement.

Camera heads tend to be relatively bulky, in comparison to the camera itself. This results because the camera head must be structurally rigid, to provide fast and precise camera movements. The camera head must also be large enough to accommodate a range of camera sizes. For certain film sequences that require the camera to move through a narrow space, such as through a window or doorway, it is often necessary to re-orient the camera head. Depending on the type of camera head and crane used, this can be a relatively time consuming process. In view of high production costs, time saving equipment is advantageous. Although existing camera head designs may be re-oriented in varying amounts of time and difficulty, engineering challenges remain in providing equipment allowing for quick and easy reorientation of a camera head.

SUMMARY OF THE INVENTION

In one aspect, an accessory for use on a camera crane has a first plate attachable to an end of the camera crane arm. A second plate is pivotally attached to the first plate and moveable into a first position and into a second position perpendicular to the first position. First and second latches secure the second plate into the first and second positions, respectively.

DETAILED DESCRIPTION OF THE DRAWINGS

In the drawings, wherein the same reference number indicates the same element in each of the views:

FIG. 1 is a side view of a prior art telescoping crane, mounted on a mobile base or vehicle, with the crane in the retracted position.

FIG. 2 is a side view of the crane shown in FIG. 1, with the arm now fully extended.

FIGS. 6, 7 and 8 are side, top and end views of the accessory shown in an up position.

FIG. 9 shows side and end views of the latch bolts shown in FIGS. 6 and 7.

DETAILED DESCRIPTION

Figure 3:
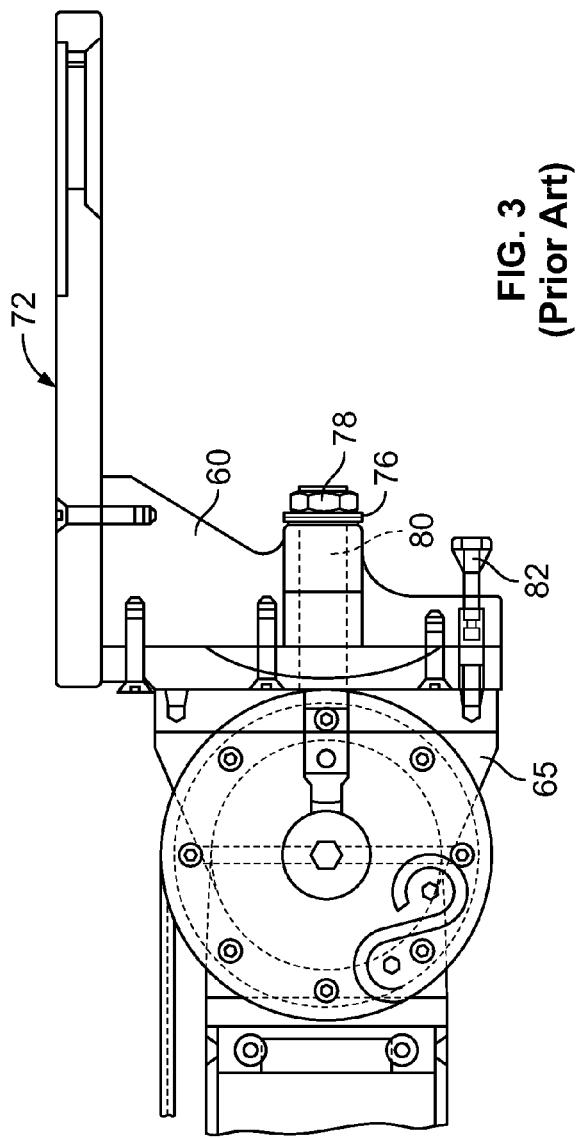
FIG. 3 is an enlarged side view, in part section, of the nose bracket of the crane arm shown in FIG. 2, but with a prior art nose plate attached to the crane arm, instead of the riser shown in FIGS. 1-2.

Turning now in detail to the drawings, as shown in FIGS. 1 and 2, a telescoping crane 30 is mounted onto a mobile base 32. The mobile base 32 may be a truck or road vehicle or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 15 feet, the mobile base 32 may be un-motorized, and may be moved or pushed by hand. For larger versions of the telescoping crane 30, or when required due to ground conditions or other use requirements, the mobile base 32 can have electric motors, or internal combustion engines, for driving the wheels 34.

As shown in FIGS. 1 and 2, the crane 30 has a telescoping crane arm 35 pivotally mounted on an axle 70 on a U-shaped center post 46 which is retractably mounted on the column 36 supported on the mobile base 32. The crane arm can therefore pivot in elevation and rotate in azimuth or panning direction.

Figure 4:
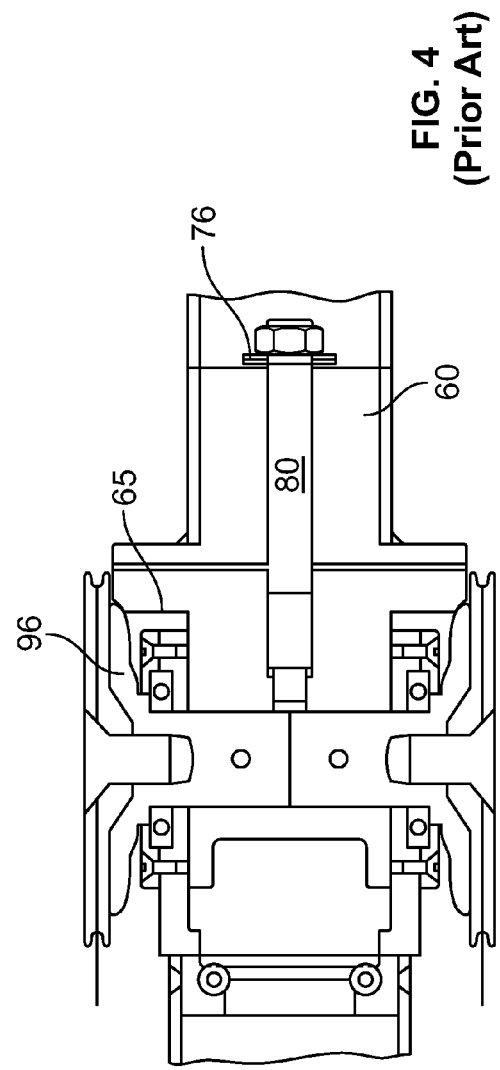
FIG. 4 is a plan view of the nose bracket and the prior art nose plate shown in FIG. 3.

Referring to FIGS. 2-4 a nose bracket 65 is attached to split nose axles 96 pivotally attached at the front end of the front or inner section of the telescoping crane arm 35. A riser, dropdown plate or extension 60 can be attached to the nose bracket 65. A camera head 62, such as a remote control or gyro-stabilized camera head is attached to the extension 60. A camera 64 is supported on the camera head 62. The extension 60 supporting the camera head 62 can be rotated to different angular positions about the roll axis by loosening a nut 78 on a nose stud 80 extending forwardly out of the nose bracket 65, and by pulling out a quick release pin 82. The extension 60 can then be quickly indexed about the roll axis in increments of e.g., 30 degrees. The roll axis is the axis passing through the centerline of the nose stud 80. However, with the nose bracket 65 and extension 60, there is no way to quickly change the orientation of the head in the pitch or elevation axis. The pitch axis is an axis parallel to the centerline of the split nose axles 96. The camera crane shown in FIGS. 1-4 is described in my U.S. Pat. No. 7,854,555, incorporated herein by reference.

To overcome this issue, an apparatus or crane nose accessory 100 that allows a camera head to be quickly re-positioned between first and second positions relative to a pitch axis. The apparatus 100 in a basic form supports the camera head 62 on the end of the crane arm, via a hinge connection that allows the camera head 62 to pivot about a pitch axis. The hinge connection may be provided in various alternative ways. The apparatus 100 is may be used in place of the prior art riser 60 shown in FIGS. 1 and 2, or in place of the prior art nose plate 72 shown in FIG. 3.

Referring to FIGS. 5-8, one example of the present apparatus 100 may include a back plate 102, a hinge plate 104 and a head plate 106. In this design, the back plate 102 and the hinge plate 104 are bolted together via bolts 118. Each plate 102 and 104 has a through mounting bore 110. The nose stud 80 passes through the bores 110 and the plates 102 and 104 are bolted onto the nose stud 80 via the nut 78. A needle bearing 76 or other friction reducing device may be positioned between the nut 78 and the hinge plate 104. The back plate 102 is typically clamped against a front end surface of the nose bracket 65. A spring biased quick release pin 116 extends through both plates 102 and 104 and into one of several angularly spaced apart roll axis indexing holes, similar to the pin 82 used in the design shown in FIGS. 1-4. The apparatus 100 may be indexed about the roll axis in the same way as described in FIGS. 1-4. A bushing 112 may be provided in the bore 110 to better provide smooth and quiet roll axis repositioning movement.

Figure 10:
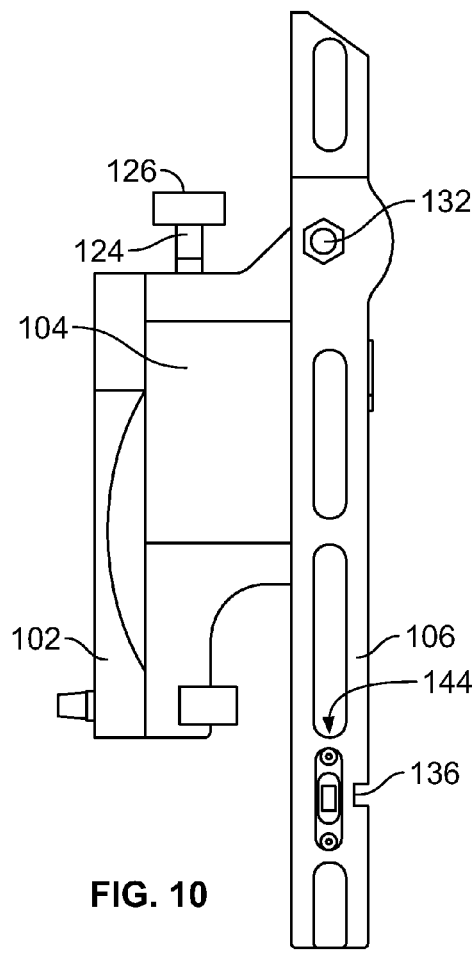
FIGS. 10, 11 and 12 are side, top and end views of the accessory shown in a down position.
Figure 11:
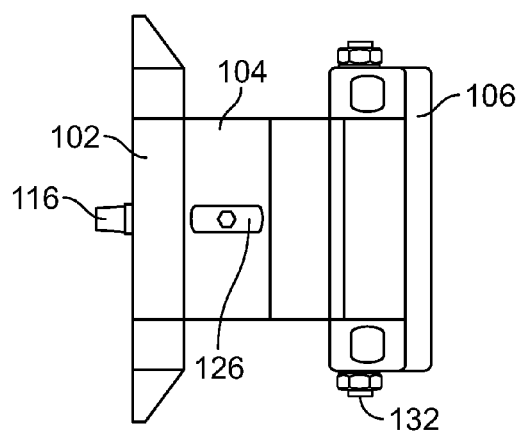
Figure 12:
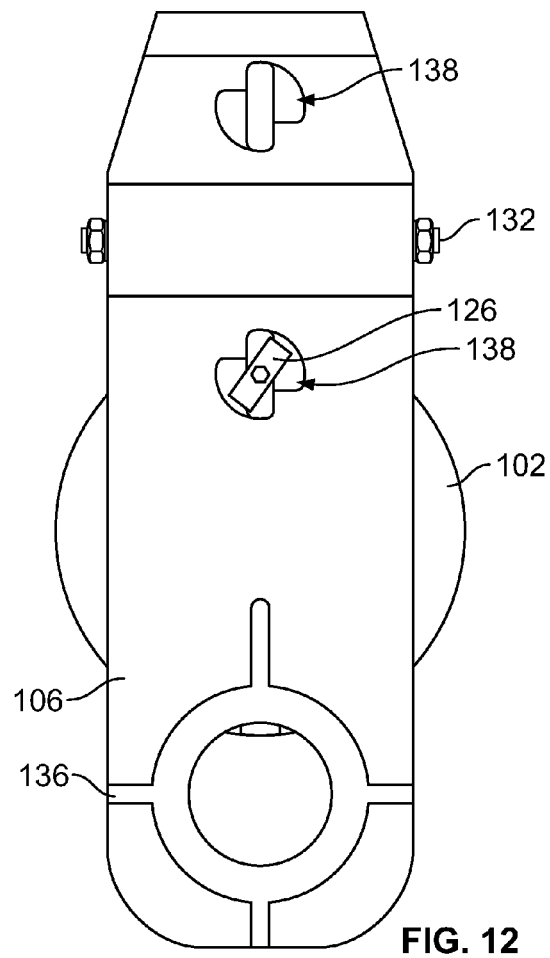

The head plate 106 is pivotally attached to the hinge plate 104 so that it can be fixed into a up or horizontal position, as shown in FIGS. 5-8, or into a down or vertical position as shown in FIGS. 10-12. This may be achieved via a hinge pin 132 extending through holes in a hinge arm 132 on the hinge plate 104, and through the back end of the head plate 106. The hinge pin 132 may be secured via nuts 134 on each end.

Figure 5:
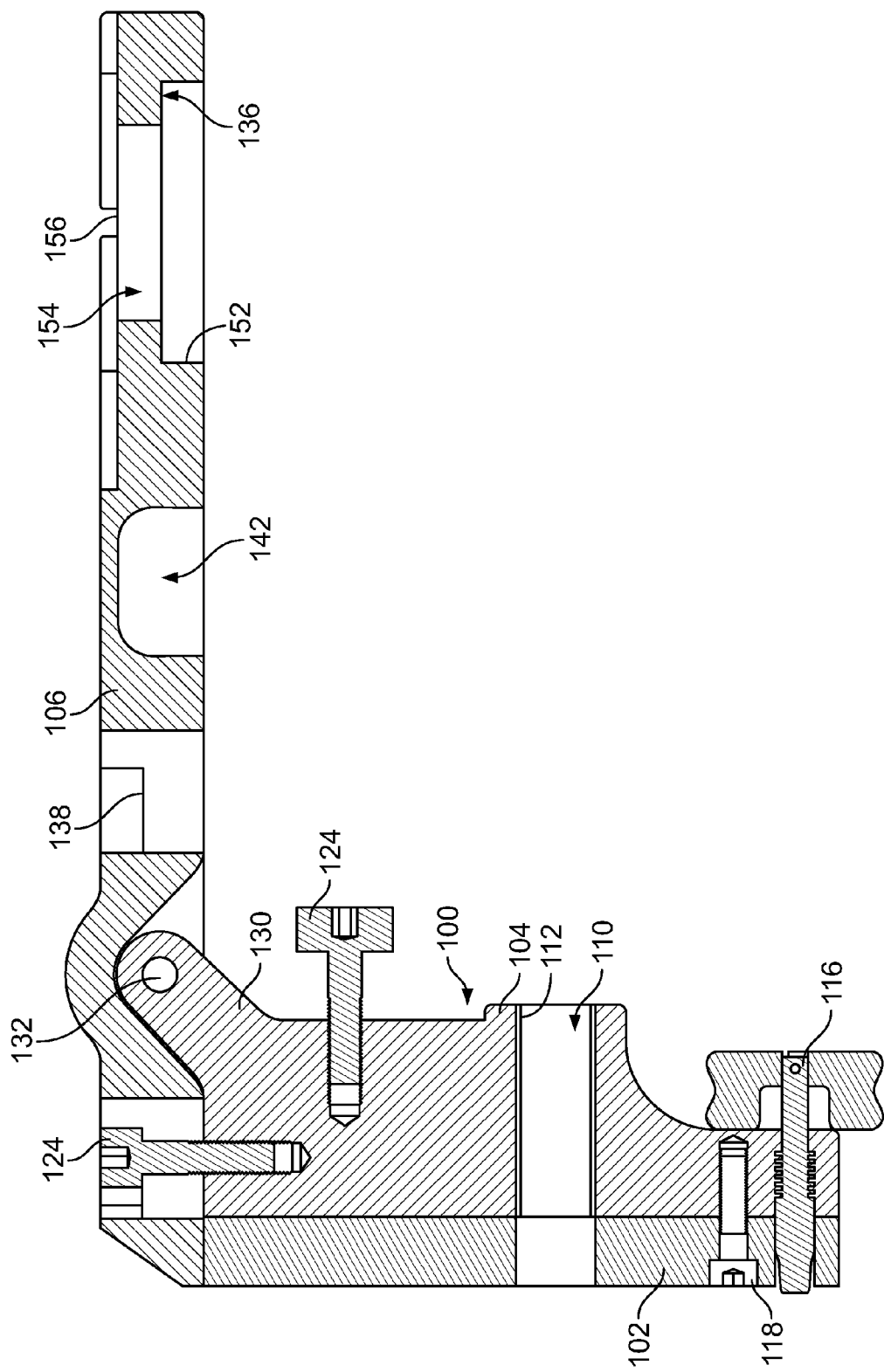
FIG. 5 is a side section view of a new accessory for use with a camera crane.
Figure 15:
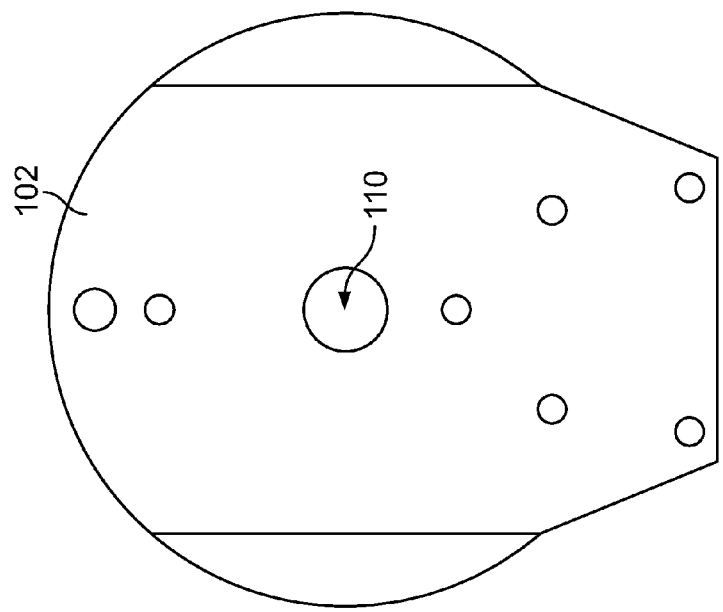
FIG. 15 is a front view of the back plate shown in FIGS. 5-7.
Figure 14:
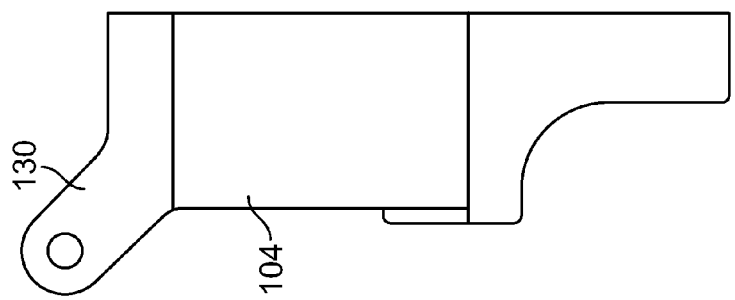
FIG. 14 is a side view of the hinge plate.
Figure 13:
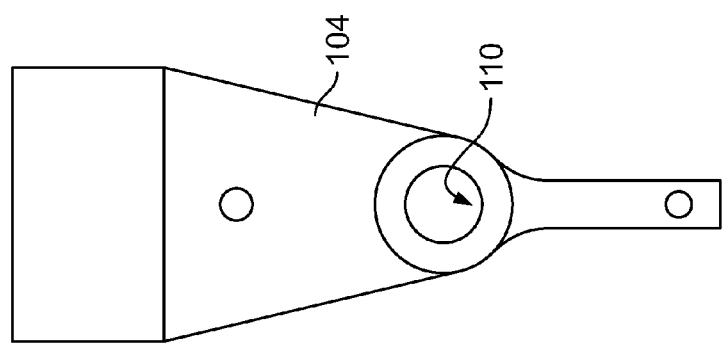
FIG. 13 is an end view of the hinge plate shown in FIGS. 5-7.

The head plate 106 typically has a head mounting fitting 136, such as a standard Mitchell mount at the front end. As shown in FIG. 5, this fitting typically has a shoulder 152, a through hole 154 and an annular land area for a top nut. The camera head 62 generally has a large mounting stud which passed though a hole in the mounting fitting 136 and which is secured via a nut. The mounting stud may be hollow to allow cables to pass through. As shown in FIGS. 5 and 7, a quarter-turn recess 138 is provided in the head plate 106, in front and behind the hinge pin 132. A corresponding quarter-turn bolt 124 is threaded into the hinge plate 104, with one bolt 124 oriented vertically and one bolt 24 oriented horizontally in FIG. 6. As shown in FIGS. 9-10, the bolt 124 has a rectangular head 126 and a hex socket 128. FIGS. 13-14 show the hinge plate 104 alone and FIG. 15 shows the back plate 102 alone.

In FIG. 5, the head 126 of the bolt 124 is engaged with the recess 138. The head plate 106 accordingly is secured into the up position shown in FIG. 5. To reposition the head plate 106, the vertical bolt 124 in FIG. 5 is turned counter clockwise until the head 126 of the bolt 124 aligns with a clearance slot 148 in the recess 138. This may be performed using a hex tool inserted into the hex fitting 128 in the head 126 of the bolt 124. With the head 126 aligned with the slot 148, the head plate 106 is freed and pivot about the hinge pin 132, from the position shown in FIGS. 5-8, to the down or vertical position shown in FIGS. 10-12. After the head plate 106 is pivoted into the down or vertical position, the head plate 106 is again secured in place via the horizontal bolt 124, as described above. The quarter turn recess 138 may have a ramp or sloped land area which the bottom of the head 126 bears on, to provide a clamping or cam-like action. As shown in FIGS. 6-8, slots 144 or other openings may be provided in the plates 102, 104, and/or 106 to reduce weight. A cutout 142 on the bottom of the head plate 106 provides clearance around the bolt 124 when the head plate 106 is in the down position. Bubble levels 140 may be provided in the head plate 106 to assist in leveling.

With the apparatus 100 in the up position as shown in FIGS. 5-7, the camera head 62 is positioned in the conventional position, supported from above, similar to the configuration shown in FIGS. 1-3. With the apparatus 100 in the down position as shown in FIGS. 10-12, the head 62 is rotated 90 degrees. In this position, the head 62 is moved more generally into alignment with the telescoping extension axis of the crane arm, as opposed to being more generally perpendicular to the extension axis of the crane arm, as in FIGS. 1-3. Consequently, with the apparatus 100 in the down position, the head 62 can more readily fit through confined openings. For example, if a filming sequence requires that the camera move through a doorway or a window, repositioning the camera head 62 using the apparatus 100 may allow the sequence to be quickly achieved.

Many camera heads 62 are electronically stabilized, such as the camera head described in U.S. Pat. No. 7,252,441, incorporated herein by reference. These types of camera heads generally stabilize the camera platform via motors acting in three perpendicular directions, i.e. in the pan, tilt and roll axes. However, if the camera head is re-oriented in a way that causes any two of these axes to coincide with each other, then stabilization is reduced to two axes instead of three axes. The apparatus 100 can be used to avoid this condition and to retain three axis stabilization, depending on the camera orientation used, by realigning the head.

Although elements 102, 104 and 106 are described as plates, they are not necessarily flat conventional plates, but rather have varying dimensions and features, as shown in the drawings.

Thus, a novel apparatus for a camera crane has been shown and described. Various modifications may of course be made without departing from the spirit and scope of the invention. The invention, therefore, should not be limited except by the following claims and their equivalents.

The invention claimed is:

1. An accessory for a camera crane arm, comprising:
   a first plate attachable to an end of the camera crane arm;
   a second plate pivotally attached to the first plate and moveable into a first position and into a second position perpendicular to the first position;
   a first latch on the first plate positioned to latch the second plate into the first position; and
   a second latch on the first plate positioned to latch the second plate into the second position.

2. The accessory of claim 1 with:
   the first latch comprising a first fastener having a head with only two flat opposing sides, with the first fastener adapted to engage a first latch recess in the second plate;
   and with the second latch comprising a second fastener having a head with only two flat opposing sides, with the second fastener adapted to engage a second latch recess in the second plate.

3. The accessory of claim 2 further comprising a pivot pin extending through the second plate, and with the first and second latch recesses on opposite sides of the pivot pin.

4. The accessory of claim 1 further comprising:
   a third plate attached to the first plate:
      a quick release pin extending through both the first and third plates
      to engage an index hole in a nose bracket on the crane arm; and
      a threaded fastener extending through the first and third plates and holding them onto the nose bracket.

5. The accessory of claim 2 with the first and second latch recesses each including a through slot dimensioned to allow the head of the fastener to pass through, and opposing ramp sections on opposite sides of the through slot.

6. The accessory of claim 1 wherein the first and second latches each comprise a bolt threaded into the first plate.

7. An accessory for a camera head on a camera crane, comprising:
   a back plate;
   a hinge plate rigidly attached to the back plate;
   a head plate pivotally attached to the hinge plate via a hinge pin passing through the head plate, with the head plate moveable from a first position to a second position perpendicular to the first position, with the head plate including a camera head mounting fitting;

a first bolt in the hinge plate positioned to pass through a first opening in the head plate, when the head plate is in the first position, and with the first bolt rotatable to secure the head plate in the first position;

a second bolt in the hinge plate, perpendicular to the first bolt, with the second bolt positioned to pass through a second opening in the head plate, when the head plate is in the second position, and with the second bolt rotatable to secure the head plate in the second position; and the first and second openings on opposite sides of the hinge pin.

8. The accessory of claim 7 further comprising a quick release pin extending through the hinge plate and the back plate.

* * * * *